United States Patent
Olson et al.

(10) Patent No.: US 8,469,630 B2
(45) Date of Patent: Jun. 25, 2013

(54) SENSOR SYSTEM FOR CONSTRUCTION EQUIPMENT HAVING WIRELESS SONIC SENSOR SYSTEM

(75) Inventors: Michael R. Olson, Brooklyn Park, MN (US); Jack Zeng, Eden Prairie, MN (US)

(73) Assignee: Sauer-Danfoss Inc., Ames, IA (US)

( * ) Notice: Subject to any disclaimer, the term of this patent is extended or adjusted under 35 U.S.C. 154(b) by 45 days.

(21) Appl. No.: 13/293,694

(22) Filed: Nov. 10, 2011

(65) Prior Publication Data

US 2013/0121764 A1 May 16, 2013

(51) Int. Cl.
*E01C 23/00* (2006.01)

(52) U.S. Cl.
USPC .......................................... 404/84.05; 701/50

(58) Field of Classification Search
USPC ........... 404/84.05; 222/41; 701/50; 56/10.2 R
See application file for complete search history.

(56) References Cited

U.S. PATENT DOCUMENTS

| | | | |
|---|---|---|---|
| 5,452,966 A | 9/1995 | Swisher, Jr. | |
| 5,529,434 A | 6/1996 | Swisher, Jr. | |
| 5,575,583 A | 11/1996 | Grembowicz et al. | |
| 5,724,912 A | 3/1998 | Cull | |
| 7,144,191 B2 * | 12/2006 | Kieranen et al. | 404/84.1 |
| 7,484,911 B2 | 2/2009 | Frelich | |
| 7,575,395 B2 | 8/2009 | Stridiron et al. | |
| 7,714,705 B2 | 5/2010 | Rennie et al. | |
| 7,839,301 B2 | 11/2010 | Doherty | |
| 7,957,850 B2 | 6/2011 | Anderson | |
| 7,983,821 B2 | 7/2011 | Reeves | |
| 2002/0168226 A1 | 11/2002 | Feucht et al. | |
| 2003/0076118 A1 | 4/2003 | Adams et al. | |
| 2004/0211092 A1 | 10/2004 | Barnes | |
| 2004/0247388 A1 | 12/2004 | Lloyd | |
| 2007/0288147 A1 * | 12/2007 | Reeves | 701/50 |
| 2010/0256837 A1 | 10/2010 | Schmidt | |
| 2010/0274439 A1 | 10/2010 | Reeves | |
| 2011/0137491 A1 | 6/2011 | Self et al. | |
| 2011/0165286 A1 | 7/2011 | Bachman et al. | |
| 2012/0017556 A1 * | 1/2012 | Reeves | 56/16.4 R |

FOREIGN PATENT DOCUMENTS

| | | |
|---|---|---|
| WO | 2010128981 | 11/2010 |
| WO | 2011091294 | 1/2011 |

* cited by examiner

*Primary Examiner* — Gary Hartmann
(74) *Attorney, Agent, or Firm* — Zarley Law Firm, P.L.C.

(57) ABSTRACT

A sensor system for road construction equipment. The system includes a first conveyor for transporting material to a first auger that is positioned to receive the material. A first feeder sensor associated with the first conveyor is in over-the-air communication with a receiver to communicate the height of a material on the conveyor such that a master controller that is electrically connected to the receiver can regulate the amount of flow of material to the first conveyor.

11 Claims, 2 Drawing Sheets

SENSOR SYSTEM FOR CONSTRUCTION EQUIPMENT HAVING WIRELESS SONIC SENSOR SYSTEM

BACKGROUND OF THE INVENTION

This invention relates to construction equipment. More specifically, this invention relates to wireless sonic auger and feeder systems for road construction equipment.

In the road construction arts sonic auger and sonic feeders are placed in close proximity to people and other moving construction vehicles. Cables are utilized for these sensors including connectors for the cables where the cables and connectors often get damaged because of the close proximity to traffic and due to activity at busy construction sites. In addition, the sensor cable must be connected to the machine's control system and the body of the machine which additionally exposes the cables to damage.

Thus a need in the art exists for eliminating the cables of the sensors at a construction site. Further, a need exists for providing additional safety and efficiency at sites related to using sensors.

Thus, a principal object of the present invention is to utilize wireless sensors for construction equipment.

Yet another object of the present invention is to improve the efficiency of sensors on construction equipment. These and other objects, features, and advantages will become apparent from the specification and claims.

BRIEF SUMMARY OF THE INVENTION

A sensor system for road construction equipment that has a first conveyor for transporting material to a first auger that is positioned to receive the material from the first conveyor. A first feeder sensor is associated with the first conveyor and has a transceiver. A receiver at the construction equipment has a first transceiver that is in over-the-air communication with the first feeder sensor to receive information from the transceiver of the first feeder sensor. A master controller is electrically connected to the receiver in order to receive communication from the receiver to control the flow of material onto the first conveyor.

DETAILED DESCRIPTION OF THE PREFERRED EMBODIMENT

Figure 1:
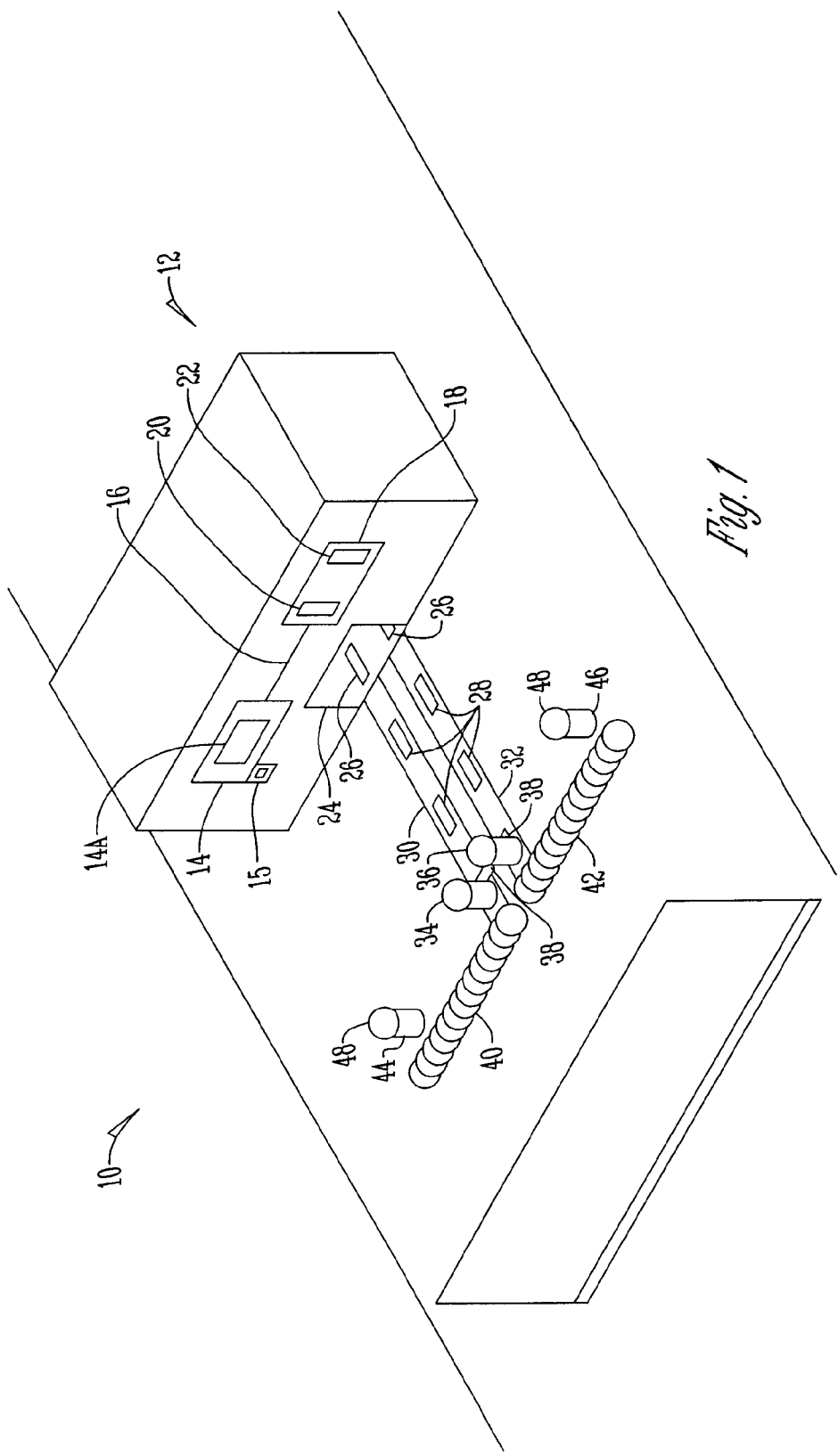
FIG. 1 is a top schematic diagram of construction equipment using a sonic sensor system.

The figures show a sensor system 10 utilized in association with construction equipment 12 that in a preferred embodiment is a material hopper utilized on a road construction work site. The construction equipment 12 includes a master controller 14 with machine control software 14a that can have a manual user interface 15. The machine control software 14a can include application programming interface that electrically communicates with a CAN BUS or the software 16 of a receiver 18 that is associated with the construction equipment 12. Thus, an electrical connection is provided between the receiver 18 and master controller 14 such that information including data can be transferred between the receiver 18 and master controller 14.

The receiver 18 additionally has first and second transceivers 20 and 22 for providing radio transmissions where in a preferred embodiment the transceivers 20, 22 are 802.15.4 wireless radio links. In addition, by having first and second transceivers 20, 22 instead of just a single transceiver the sensor system's bandwidth is increased, allowing the second transceiver 22 to scan radio channels for activity.

An opening 24 is disposed within the construction equipment 12 and is adjacent conveying equipment 26 that conveys materials 28 onto first and second conveyors or feeders 30 and 32 that are adjacent the opening 24 and receive the material 28. The first and second feeders 30, 32 have a first feeder sensor 34 and second feeder sensor 36 respectively where the first feeder sensor 34 is associated with and adjacent the first feeder 30 and the second feeder sensor 36 is associated with and adjacent the second feeder 32. In a preferred embodiment each of the first and second feeder sensors 34, 36 are sonic sensors. In addition, each of the first and second feeder sensors 34, 36 have transceivers 38 that provide over-the-air communication with the first transceiver 20 of the receiver 18. Thus, the transceivers 38 of the sensors 34, 36 have bi-directional communication with the first transceiver 20 of the receiver 18.

First and second augers 40 and 42 are presented adjacent the first and second feeders 30, 32 such that the first auger receives material 28 conveyed across the first feeder 30 and the second auger 42 receives material 28 conveyed across the second feeder 32. To that end, the first and second augers 40, 42 are positioned perpendicular to the first and second feeders 30, 32 to move material 28 transversely. The first auger 40 has a first auger sensor 44 associated therewith while the second auger 42 has a second auger sensor 46 associated therewith where in a preferred embodiment the first and second auger sensors 44, 46 are sonic sensors.

Each of the first and second auger sensors 44, 46 have transceivers 48 that allow over-the-air communication with the first transceiver 20 of the receiver 18. Thus, similar to the first and second feeder sensors 34, 36 the first and second auger sensors 44, 46 provide a communication path in order to communicate information including data related to the first and second augers 40, 42 to the receiver 18 that then communicates such information to the master controller 14 to control the flow of material 28 being placed on the first and second feeders 30, 32.

Figure 2:
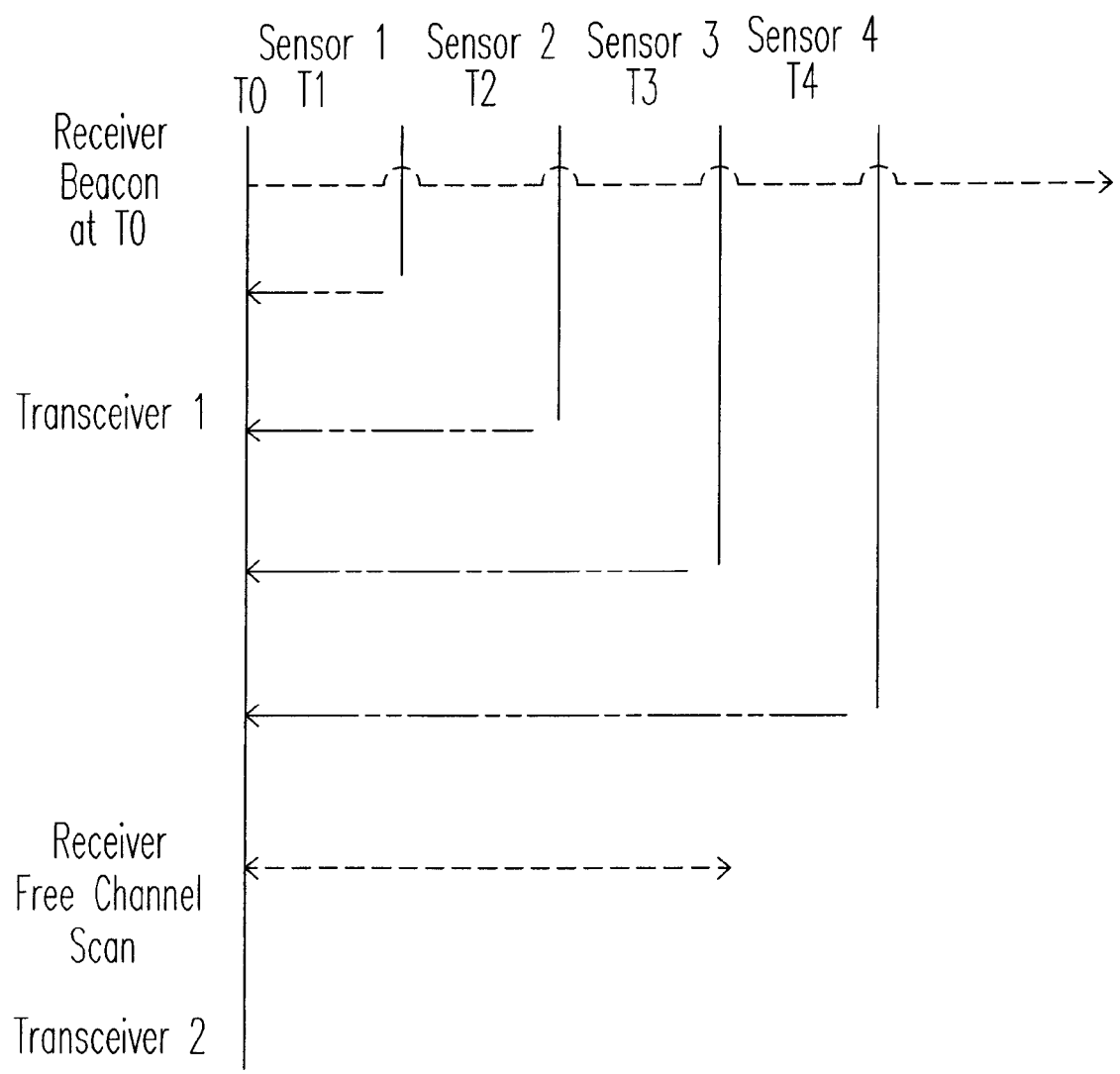
FIG. 2 is a protocol timing graph showing the movement of radio frequencies to and from transceivers of a receiver.

In operation, the receiver 18 transmit a time triggered time protocol beacon at time=zero, T0, as shown in FIG. 2. Each one of the sensors, 34, 36, 44, and 46 responds with its positioning and status data in its respective time slot. Specifically, the sensors 34, 36, 44 and 46 indicate the amount and height of material 28 at the respective locations. Simultaneously the second transceiver 22 of the receiver 18 can be used to collect wireless sensor data and to scan all radio channels to enable the receiver 18 to proactively command the sensors 34, 36, 44, and 46 to switch to a radio channel that has a minimum amount of traffic or less traffic than the current channel being utilized.

The receiver 18 then sorts the sensor data into a CAN message that is transmitted over the machine controlled CAN bus 16 to the master controller 14 which then controls the amount of material 28 provided to the first and second feeders 30 and 32. In an alternative embodiment the master controller 14 determines the elevation, and/or the steering of the construction equipment 12. Specifically, the master controller 14 controls and automates the construction equipment 12 to accomplish a desired task. In addition, the master controller 14 can also poll the receiver status, and can poll sensor status.

Additionally, the master controller 14 can be manually set to different channels using interface 15.

Thus provided is a sensing system 10 that is utilized on construction equipment 12 such as feeders 30, 32 and augers 40, 42 in order to automatically control the flow of material 28 for construction machines by sensing the height of the material and sending the height measurement back to the master controller 14 which in turn regulates the flow of material 28. This can be done for any type of construction including road construction and preferably road building applications. Thus, the sensing system 10 presents wireless sonic auger and sonic feeder sensors with the capability to read the multiple wireless sensors at a very high data rate through a time triggered custom wireless protocol. Additionally presented is the capability to actively switch to load traffic channels in a direct sequence spread spectrum (DSSS) system in a road construction environment. Thus, cables can be eliminated reducing the risks associated with the use of cables and at the very least all of the stated objective have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A sensor system for construction equipment comprising:
   a first feeder for transporting material;
   a first auger positioned to receive the material from the first feeder;
   a first feeder sensor associated with the first feeder and having a transceiver;
   a receiver having a first transceiver in over-the-air communication with the first feeder sensor to receive information from the transceiver of the first feeder sensor; and
   a master controller electrically connected to the receiver to receive communication from the receiver to control the flow of material onto the first feeder.

2. The sensor system of claim 1 further comprising:
   a first auger sensor associated with the first auger and having a transceiver that communicates information to the receiver.

3. The sensor system of claim 2 further comprising:
   a second feeder for transporting the material adjacent the first feeder and having a second feeder sensor associated therewith wherein the second feeder sensor communicates with the receiver.

4. The sensor system of claim 3 further comprising:
   a second auger positioned to receive the material from the second feeder and having a second auger sensor associated therewith for communicating information to the receiver.

5. The sensor system of claim 1 wherein the first transceiver of the receiver is a wireless radio link.

6. The sensor system of claim 1 wherein the receiver has a second transceiver that scans radio channels.

7. The sensor system of claim 6 wherein based on the radio channels scanned the receiver communicates with the first feeder sensor to change a radio channel of the first feeder sensors.

8. The sensor system of claim 1 wherein the receiver transmits a time triggered beacon to the first feeder sensor.

9. The sensor system of claim 8 wherein the first feeder sensor communicates information in response to receiving the time triggered beacon to the receiver.

10. The sensor system of claim 9 wherein the receiver communicates the information communicated from the first feeder sensor to the master controller.

11. The sensor system of claim 10 wherein the master controller controls the flow of material to the first feeder based on the information communicated to the master controller.

* * * * *